(12) United States Patent
Liu et al.

(10) Patent No.: US 11,479,722 B2
(45) Date of Patent: Oct. 25, 2022

(54) METHOD FOR PREPARING DISPERSANT USING LIGNIN DEGRADATION PRODUCTS

(71) Applicant: Fu Zhou University, Fujian (CN)

(72) Inventors: Minghua Liu, Fujian (CN); Yingfang Huang, Fujian (CN); Minya Wu, Fujian (CN); Yifan Liu, Fujian (CN); Yuancai Lv, Fujian (CN)

(73) Assignee: Fu Zhou University, Fuzhou (CN)

( * ) Notice: Subject to any disclaimer, the term of this patent is extended or adjusted under 35 U.S.C. 154(b) by 0 days.

(21) Appl. No.: 16/967,720

(22) PCT Filed: Aug. 28, 2019

(86) PCT No.: PCT/CN2019/102964
§ 371 (c)(1),
(2) Date: Aug. 5, 2020

(87) PCT Pub. No.: WO2020/215561
PCT Pub. Date: Oct. 29, 2020

(65) Prior Publication Data
US 2022/0048001 A1    Feb. 17, 2022

(30) Foreign Application Priority Data

Apr. 26, 2019    (CN) .......................... 201910344143.7

(51) Int. Cl.
*C09K 23/00* (2022.01)
*B01J 19/12* (2006.01)
(Continued)

(52) U.S. Cl.
CPC .............. *C09K 23/00* (2022.01); *B01J 19/126* (2013.01); *C04B 24/166* (2013.01);
(Continued)

(58) Field of Classification Search
CPC ................................. B01J 19/126; C08H 6/00
See application file for complete search history.

(56) References Cited

U.S. PATENT DOCUMENTS

| | | | | |
|---|---|---|---|---|
| 3,668,123 A * | 6/1972 | Steinberg | ............... | C09K 8/203 |
| | | | | 530/506 |
| 4,220,585 A * | 9/1980 | Javora | .................... | C08H 6/00 |
| | | | | 530/506 |

(Continued)

FOREIGN PATENT DOCUMENTS

| | | |
|---|---|---|
| CN | 102504477 A | 6/2012 |
| CN | 104474966 A | 4/2015 |

(Continued)

OTHER PUBLICATIONS

Ouyang et al. (Journal of Fuel Chemistry and Technology, vol. 42(6), 2014, 677-682) (Year: 2014).*

(Continued)

*Primary Examiner* — Liam J Heincer
(74) *Attorney, Agent, or Firm* — Bayramoglu Law Offices LLC

(57) ABSTRACT

A method for preparing dispersant using lignin degradation products includes preparation of lignin degradation products: degrading lignin which are used as raw materials using alkali through microwave-assisted activation at the presence of a metal oxide catalyst to obtain the lignin degradation products; and preparation of dispersant: preparing dispersant by molecularly reforming and chemically modifying the lignin degradation products obtained in the step of preparation of lignin degradation products.

7 Claims, 2 Drawing Sheets

(51) Int. Cl.
*C04B 24/16* (2006.01)
*C04B 33/13* (2006.01)
*C08G 12/08* (2006.01)
*C08G 12/24* (2006.01)
*C08G 12/40* (2006.01)
*C08H 7/00* (2011.01)
*C09B 67/20* (2006.01)
*C10L 1/32* (2006.01)
*C04B 103/30* (2006.01)
*C04B 103/40* (2006.01)

(52) U.S. Cl.
CPC .......... *C04B 33/1305* (2013.01); *C08G 12/08* (2013.01); *C08G 12/24* (2013.01); *C08G 12/40* (2013.01); *C08H 6/00* (2013.01); *C09B 67/0066* (2013.01); *C10L 1/326* (2013.01); *C04B 2103/302* (2013.01); *C04B 2103/408* (2013.01)

(56) References Cited

U.S. PATENT DOCUMENTS

| | | | | |
|---|---|---|---|---|
| 4,847,422 | A * | 7/1989 | Klemola | C07C 45/81 568/426 |
| 6,100,385 | A * | 8/2000 | Naae | C07G 1/00 530/502 |
| 2007/0260046 | A1* | 11/2007 | Tomita | C08H 6/00 530/500 |
| 2009/0209739 | A1* | 8/2009 | Funaoka | B01J 20/28023 530/502 |
| 2012/0142876 | A1* | 6/2012 | Kawakami | C04B 24/267 526/240 |
| 2014/0107381 | A1* | 4/2014 | Beckham | B01J 35/002 585/240 |
| 2014/0249300 | A1* | 9/2014 | Bozell | C07G 1/00 530/507 |
| 2015/0041083 | A1* | 2/2015 | Yoshikawa | C08H 6/00 162/19 |
| 2016/0009621 | A1* | 1/2016 | Blair | B01J 23/002 562/475 |
| 2016/0052949 | A1* | 2/2016 | Beckham | B01J 37/0201 568/322 |
| 2017/0145043 | A1* | 5/2017 | Subramaniam | C07C 41/18 |
| 2017/0152278 | A1* | 6/2017 | Samec | C07G 1/00 |
| 2018/0327311 | A1* | 11/2018 | Kalliola | C04B 24/24 |
| 2021/0292632 | A1* | 9/2021 | Nakamura | C04B 28/04 |

FOREIGN PATENT DOCUMENTS

WO WO2015/049424 4/2015
WO WO2017/171652 A1 10/2017

OTHER PUBLICATIONS

He et al. (Colloids and Surfaces A: Physicochem. Eng. Aspects 503 (2016) 19-27) (Year: 2016).*

* cited by examiner

METHOD FOR PREPARING DISPERSANT USING LIGNIN DEGRADATION PRODUCTS

BACKGROUND OF THE INVENTION

1. Technical Field

The invention belongs to the technical field of dispersant and it specifically relates to a method for preparing dispersant using lignin degradation products and applications.

2. Description of Related Art

Reservoirs of non-renewable energy, such as oil and gas, are diminishing, and environmental issues are becoming increasingly severe, along with the economic and industrial growth of the world. Replacing fuel and chemicals with renewable biomass resources has become the future development trend. Lignin, cellulose and hemicellulose are important constituent parts of plant tissues, and are crucial biomass resources. Among those resources, lignin which widely spread in the natural world and contain a unique phenylpropane structure are potential raw material for producing phenol, and are also a primary side product of the pulping and paper industry. However, over 95% of industrial lignin has been simply disposed as waste, for example, burning to obtain low-grade heat. Therefore, the utilization percentage is extremely low, and a great amount of resources are wasted.

Lignin belong to a class of complex organic polymers that are mainly composed of three basic structural units (sinapyl alcohol, syringyl alcohol and tonquinol). Lignin macromolecules contain a great of active radicals, such as aromatic base, methoxy and hydroxyl radicals, but are low in general activity and limited in the high-efficient utilization field. Lignin can be degraded to obtain important chemical raw materials such as phenols, alcohols, acids and hydrocarbons. Even if different lignin varies with monomer polymerization modes, the polymerization still follows a certain rule. Lignin is formed by connection of ⅔ ester bonds and ⅓ condensation bounds. Therefore, the degradation depends on the general degree of etherification and condensation. At present, the degradation methods of lignin increase the reaction activity by weakening or breaking the chemical bonds in lignin or producing some easily reactive radicals or active sites, to reduce the weight-average molar mass and reaction steric hindrance so as to fulfill the degradation purpose. Currently, lignin is mainly degraded by chemical degradation methods, wherein hydrothermal degradation, oxidative degradation and liquefaction degradation are the three most widely used approaches[7]. Nonetheless, these approaches are typically weakened in terms of poor degradation performance, extreme reaction conditions and high costs, etc. Patent CN201710045540.5 provided a highly efficient low-pollution method for preparing a monophenol compound from mono bamboo lignin. According to this patent, lignin was first separated from natural bamboos by enzymatic hydrolysis/mild acid hydrolysis, and then treated by using acetic anhydride and peroxyacetic acid as acetylating agents and degrading agents respectively to obtain the monophenol compound. This method was of low pollution and could obtain micromolecular degradation products of lignin with a high yield and an aromatic ring structure, but included complicated acetylation pretreatment. Patent CN201710067650.1 provided a method for preparing a monophenol compound by degrading lignin with an ammonia complex catalyst. According to this patent, a stable ammonia complex solution was formed by the metal salt and ammonia water under alkaline conditions, and oxidized and degradedat the presence of a peroxidant. However, such patent was overall long in reaction time, and needs high-pressure conditions.

In recent years, study on high-mass utilization of the lignin degradation products primary involves urethane foam materials, phenol formaldehyde resins, epoxy resins, adhesives and biofuel, etc. Lignin degradation products also have application potentials in molecular additives such as dispersant, but few reports in such as aspect are seen. Xue et al. degraded lignin of corn cobs by using NaOH as the catalyst in an isopropanol-water mixture and prepared biomass-based hard urethane foam with the degradation products as replacement of polyols. Due to the high complexity of the lignin structure, the yield of the monophenol compounds reported in most literature concerning lignin degradation is generally around 10%. Therefore, enhancing the lignin degradation efficiency and directionally converting lignin to obtain more advantages in preparation of products with a high added value will greatly improve the lignin resource means and provide a theoretical guidance on subsequent industrial production.

Existing technological processes for lignin degradation are long in overall reaction time. Some processes require high-temperature and high-voltage conditions, special solvents and precious metal catalysts, which are relatively high in cost and can even cause secondary pollution. The invention features degraded and modified lignin to obtain a low molecular weight degradation product, which is convenient for subsequent molecular reforming and chemical modification. Moreover, the obtained product is rich in phenolic hydroxyl radicals, high in chemical reaction activity, and good for the preparation of dispersant products. The invention is applicable to the fields of ceramic additives, concrete water reducing agents, dye dispersants and coal water slurry additives, can reduce the degradation cost and broaden the utilization of lignin, and has a great significance for the sustainable development of the society and economy.

BRIEF SUMMARY OF THE INVENTION

To solve defects in the prior art, the invention provides a method for preparing dispersant using lignin degradation products and applications. The process of the invention for preparing the dispersant is simple, low in cost, and suitable for industrial production.

In order to achieve the above objective, the invention adopts the following technical solution:

A method for preparing dispersant using lignin degradation products includes the following steps:

(1) preparation of lignin degradation products: degrading lignin with alkali through microwave-assisted activation at the presence of a metal oxide catalyst to obtain the lignin degradation products;

(2) preparation of dispersant: preparing the dispersant by molecularly reforming and chemically modifying the lignin degradation products.

According to the method for preparing dispersant using lignin degradation products, the preparation of the lignin degradation products in step (1) includes the following specific sub-steps:

1) mixing lignins, an alkaline activator and a metal oxide catalyst by a mass ratio, suspending the mixed materials in water, and blending the mixture well;

2) letting the mixed substances to react for 0.5 to 2 h at a temperature within the range of 120-200° C. and a microwave power within a range of 200-400 W;

3) performing suction filtration after the reaction liquid gets cool to remove solid residues and obtain the lignin degradation products;

wherein preparation of the dispersant in step (2) specifically includes the following sub-steps:

1) adding monomers into the lignin degradation products obtained in step (1), letting the mixed materials to react for 30-50 min at a temperature within a range of 50-70° C., then slowly adding a cross-linking agent, stirring the substances to let a reaction proceed for 2.5-4.5 h at a temperature within the range of 80-100° C., and after the reaction ends, adding urea and isocyanate to let the condensation reaction proceed for 4 h;

2) adjusting the pH value of the liquid obtained after the condensation reaction to 9.5-10.5, and cooling the liquid to room temperature to obtain the dispersant.

According to the method, in step (1), preparation of the lignin degradation products, the following ingredients are added in percentage by mass:

8.0%-12.0% of lignins;
4.0%-16.0% of alkaline activator;
0.1%-0.5% of catalyst;
75.5%-85.6% of water;

in step (2), preparation of the dispersant, the following ingredients are added in percentage by mass:

7.5%-12.5% of monomers;
80.0%-86.0% of lignin degradation products;
2.5%-6.25% of cross-linking agent;
1.25%-2.5% of urea; and,
0.25%-1.25% of isocyanate.

Further, the lignins include organic solvent lignin, enzymolysis lignin, milled wood lignin, Kraft lignin, sulfate lignin, alkaline lignin and natural lignin prepared using one or a mixture of several ones of bamboos, corn cobs, maize straw, bagasse, cotton straw, straw, wheat straw, Manchurian ash, Chinese silver grass, cottonwood, reeds, eucalyptuses, xylosmas, birches and Chinese red pines by means of solvent extraction, enzymolysis, mechanical process, sulfite process or alkaline process.

Further, the alkaline activator is any one or a mixture of several ones of NaOH, KOH, LiOH, $Na_2CO_3$, $K_2CO_3$ and $NaAlO_2$ at any ratio.

Further, the catalyst is any one or a mixture of several ones of zirconia, molybdenum oxide, zinc oxide, titanium oxide and columbium oxide at any ratio.

Further, the monomers are any one or a mixture of several ones of aminosulfonic acid, p-aminobenzenesulfonic acid, sodium p-aminobenzenesulfonate, sodium cyclohexylsulfamate and calcium cyclamate at any ratio.

Further, the cross-linking agent is any one or a mixture of several ones of formaldehyde, acetaldehyde, glutaraldehyde, acraldehyde and trioxymethylene at any ratio.

The relative molecular weight Mn of the dispersant prepared using the method is 6000-30000.

Applications of the dispersant prepared using the method as a ceramic additive, a concrete water reducer, a dye dispersant and a coal water slurry additive are provided.

The invention has the following beneficial effects. The lignin is degraded and modified with alkali through microwave-assisted activation at the presence of a metal oxide catalyst to obtain micro-molecular substances. The degradation process is simple in degradation process, short in period and high in degradation rate.

The degradation products are directly used to prepare dispersant through molecular reforming and chemical modification, so the cost is low. Besides, the prepared dispersant has good effects such as water reduction, dispersion and reinforcement, and can be used as a ceramic additive, concrete water reducer, dye dispersant and coal water slurry additive. This method effectively utilizes the renewable biomass-resourcing lignin as a raw material, is wide in sources and low in cost, and therefore has a key significance for society, economy and environmental protection.

DETAILED DESCRIPTION OF THE INVENTION

Figure 1:
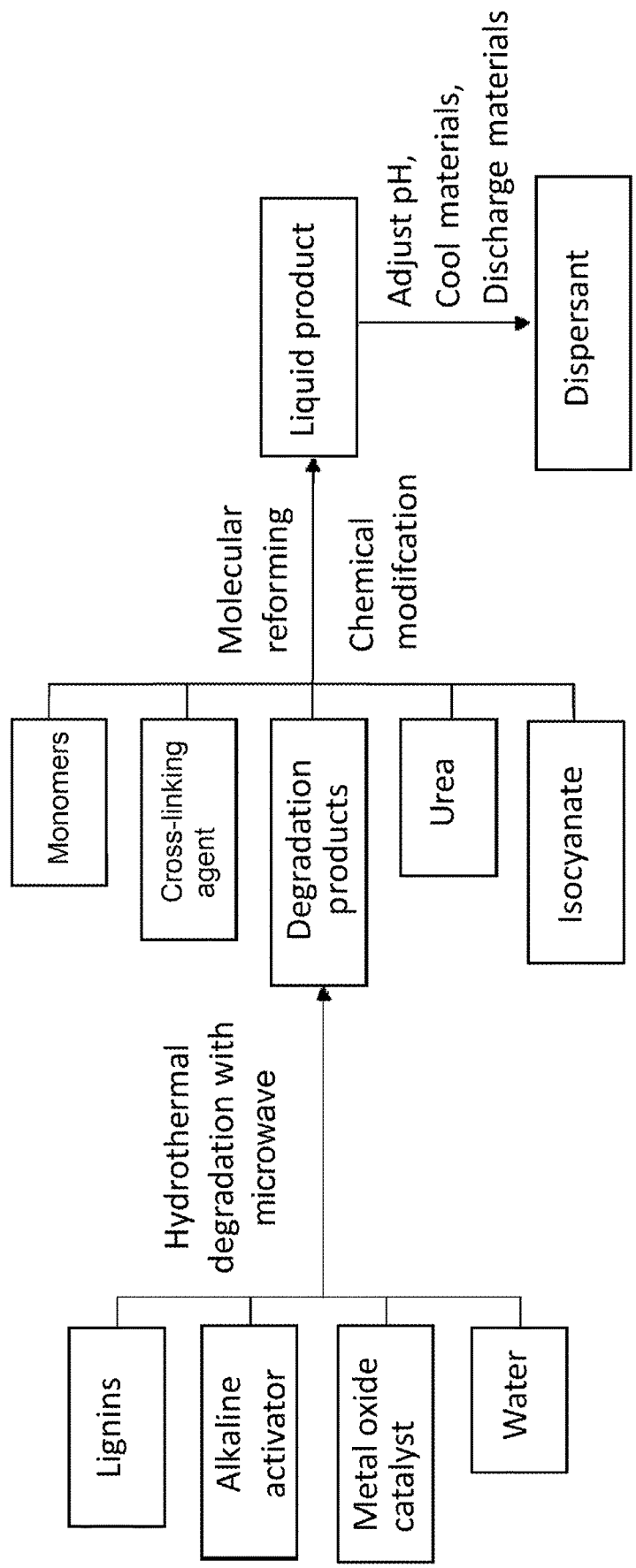
FIG. 1 is a flow chat of the method for preparing dispersant using lignin degradation products.
Figure 2:
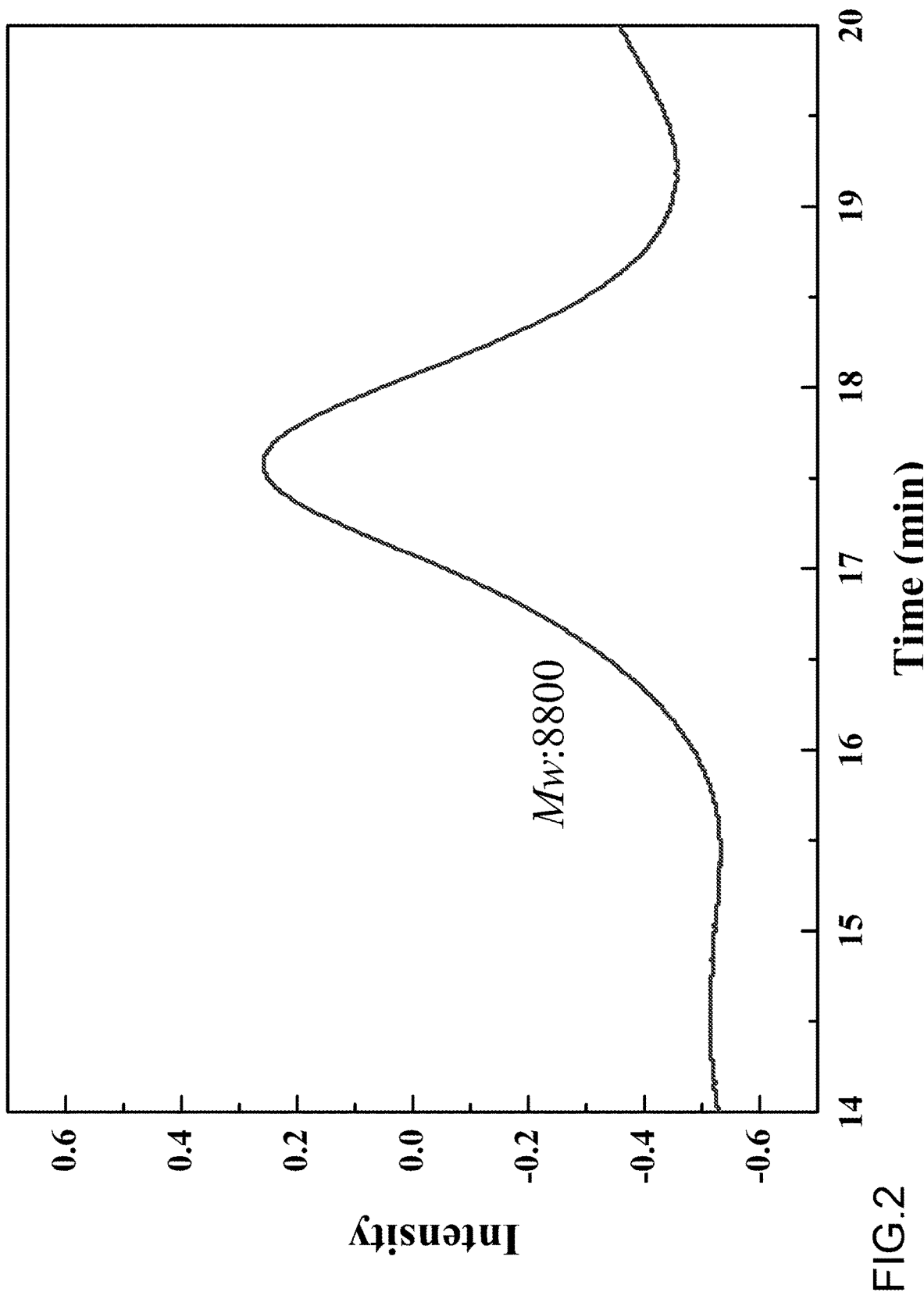
FIG. 2 is a relative molecular mass diagram of the dispersant prepared in embodiment 3.

A method for preparing dispersant using lignin degradation products includes the following steps:

(1) preparation of lignin degradation products: degrading lignins with alkali through microwave-assisted activation at the presence of a metal oxide catalyst to obtain the lignin degradation products;

(2) preparation of dispersant: preparing the dispersant by molecularly reforming and chemically modifying the lignin degradation products.

According to the method for preparing dispersant using lignin degradation products, the preparation of the lignin degradation products in step (1) includes the following specific sub-steps:

1) suspending the lignins, an alkaline activator and the metal oxide catalyst by a mass ratio in an aqueous solution, and blending the mixed substances well;

2) letting the mixed substances to react for 0.5 to 2 h at a temperature within the range of 120-200° C. and a microwave power within a range of 200-400 W;

3) performing suction filtration after the reaction liquid gets cool to remove solid residues and obtain degradation products;

wherein preparation of the dispersant in step (2) specifically includes the following sub-steps:

1) adding water into the lignin degradation products obtained in step (1), blending the mixed substances well, then adding monomers, letting the mixed materials to react for 30-50 min at a temperature within a range of 50-70° C., then slowly adding a cross-linking agent, stirring the substances to let the reaction proceed for 2.5-4.5 h at a temperature within the range of 80-100° C., and after the reaction ends, adding urea and isocyanate to let the condensation reaction proceed for 4 h;

2) adjusting the pH value of the liquid obtained after the condensation reaction to 9.5-10.5, and cooling the liquid to room temperature to obtain the dispersant.

According to the method, in step (1), preparation of the lignin degradation products, the following ingredients are added in percentage by mass:

8.0%-12.0% of lignins;
4.0%-16.0% of alkaline activator;
0.1%-0.5% of catalyst;
75.5%-85.6% of water;

in step (2), preparation of the dispersant, the following ingredients are added in percentage by mass:

7.5%-12.5% of monomers;
80.0%-86.0% of lignin degradation products;
2.5%-6.25% of cross-linking agent;
1.25%-2.5% of urea; and,
0.25%-1.25% of isocyanate.

Further, the lignins include organic solvent lignin, enzymolysis lignin, milled wood lignin, Kraft lignin, sulfate lignin, alkaline lignin and natural lignin prepared using one or a mixture of several ones of bamboos, corn cobs, maize straw, bagasse, cotton straw, straw, wheat straw, Manchurian ash, Chinese silver grass, cottonwood, reeds, eucalyptuses, xylosmas, birches and Chinese red pines by means of solvent extraction, enzymolysis, mechanical process, sulfite process or alkaline process.

Further, the alkaline activator is any one or a mixture of several ones of NaOH, KOH, LiOH, $Na_2CO_3$, $K_2CO_3$ and $NaAlO_2$ at any ratio.

Further, the catalyst is any one or a mixture of several ones of zirconia, molybdenum oxide, zinc oxide, titanium oxide and columbium oxide at any ratio.

Further, the monomers are any one or a mixture of several ones of aminosulfonic acid, p-aminobenzenesulfonic acid, sodium p-aminobenzenesulfonate, sodium cyclohexylsulfamate and calcium cyclamate at any ratio.

Further, the cross-linking agent is any one or a mixture of several ones of formaldehyde, acetaldehyde, glutaraldehyde, acraldehyde and trioxymethylene at any ratio.

The relative molecular weight Mn of the dispersant prepared using the method is 6000-30000.

Applications of the dispersant prepared using the method as a ceramic additive, a concrete water reducer, a dye dispersant and a coal water slurry additive are provided.

The flow chat of the method for preparing dispersant using lignin degradation products can be seen in FIG. 1.

Embodiment 1

A method for preparing dispersant using lignin degradation products includes the following specific steps:

(1) mixing 40 kg alkaline lignin obtained from bamboo pulp, 30 kg of NaOH and 10 kg of $NaAlO_2$, 1.2 kg of zirconia catalyst and 418.8 kg of water, then blending the mixed solution well;

(2) pouring the mixed solution into a microwave reactor, setting the reaction temperature at 180° C. and the microwave power at 300 W, letting the reaction proceed for 1 h, cooling the reaction products, discharging materials, and filtering the materials to remove solid residues and obtain the lignin degradation products;

(3) adding 40 kg of sodium p-aminobenzenesulfonate into 430 g of lignin degradation product obtained in step (3), and letting the solution react for 40 min at the temperature of 60° C. and the revolving speed of 250 rpm;

(4) adding 20 kg of formaldehyde (effective content) into the solution obtained after the reaction in step (4), stirring for reaction for 3 h at the temperature of 95° C., then slowly adding 6.25 kg of urea and 3.75 kg of isocyanate to let the condensation reaction proceed for 4 h;

(5) adjusting the pH value of the liquid product obtained after the condensation reaction ends to 10.0, cooling the product, and discharging the product to obtain the dispersant with a relative molecular weight of 17600.

Embodiment 2

A method for preparing dispersant using lignin degradation products includes the following specific steps:

(1) mixing 50 kg of lignin obtained rice hulls using an organic solvent, 15 kg of NaOH and 5 kg of KOH, 2 kg of molybdenum oxide catalyst and 428 kg of water, then blending the mixed solution well;

(2) pouring the mixed solution into a microwave reactor, setting the reaction temperature at 160° C. and the microwave power at 200 W, letting the reaction proceed for 2 h, cooling the reaction products, discharging materials, and filtering the materials to remove solid residues and obtain the lignin degradation products;

(3) adding 62.5 kg of amido-sulfonic acid into 400 g of lignin degradation product obtained in step 3), and letting the solution react for 30 min at the temperature of 50° C. and at the revolving speed of 250 rpm;

(4) adding 27.5 kg of aldehyde (effective content) into the solution obtained after the reaction in step (4), stirring for reaction for 4 h at the temperature of 90° C., then slowly adding 7.5 kg of urea and 2.5 kg of isocyanate to let the reaction continue for 4 h;

(5) adjusting the pH value of the liquid product obtained after the condensation reaction ends to 9.5, cooling the product, and discharging the product to obtain the dispersant with a relative molecular weight of 10500.

Embodiment 3

A method for preparing dispersant using lignin degradation products includes the following steps:

(1) mixing 60 kg milled wood lignin of eucalyptuses, 30 kg of NaOH and 10 kg of $Na_2CO_3$, 0.5 kg of zinc oxide catalyst and 379.5 kg of water, then blending the mixed solution well;

(2) pouring the mixed solution into a microwave reactor, setting the reaction temperature at 120° C. and the microwave power at 400 W, letting the reaction proceed for 0.5 h, cooling the reaction products, discharging materials, and filtering the materials to remove solid residues and obtain the lignin degradation products;

(3) adding 50 kg of p-aminobenzenesulfonic acid into 410 kg of lignin degradation product obtained in step (3), and letting the solution react for 50 min at the temperature of 70° C. and at the revolving speed of 250 rpm;

(4) adding 25 kg of glutaraldehyde (effective content) into the solution obtained after the reaction in step (4), stirring for reaction for 3 h at the temperature of 85° C., then slowly adding 8.75 kg of urea and 6.25 kg of isocyanate to let the condensation reaction proceed for 4 h;

(5) adjusting the pH value of the liquid product obtained after the condensation reaction ends to 10.5, cooling the product, and discharging the product to obtain the dispersant with a relative molecular weight of 8800.

The relative molecular weight of the dispersant prepared in this embodiment is determined with a gel permeation chromatograph (Waters2414, Waters Corporation in USA) by using polystyrene (PS) as the guide sample and THF as the flow phase. See FIG. 1 for results.

Embodiment 4

A method for preparing dispersant using lignin degradation products includes the following steps:

(1) mixing 40 kg of lignin obtained by enzymolysis of corn cobs, 60 kg of NaOH and 20 kg of $K_2CO_3$, 2.5 kg of titanium oxide catalyst and 377.5 kg of water, then blending the mixed solution well;

(2) pouring the mixed solution into a microwave reactor, setting the reaction temperature at 200° C. and the microwave power at 300 W, letting the reaction proceed for 1 h, cooling the reaction products, discharging materials, and filtering the materials to remove solid residues and obtain the lignin degradation products;

(3) adding 55 kg of sodium cyclohexylsulfamate into 420 kg of lignin degradation product obtained in step (3), and letting the solution react for 40 min at the temperature of 60° C. and at the revolving speed of 250 rpm;

(4) adding 15 kg of aldehyde (effective content) into the solution obtained after the reaction in step (4), stirring for reaction for 3.5 h at the temperature of 80° C., then slowly adding 8.0 kg of urea and 2.0 kg of isocyanate to let the reaction continue for 4 h;

(5) adjusting the pH value of the liquid obtained after the condensation reaction to 10.0, cooling the liquid, and discharging the liquid to obtain the dispersant with a relative molecular weight of 12300.

Embodiment 5

A method for preparing dispersant using lignin degradation products includes the following steps:

(1) mixing 50 kg of sulfate ligni of Chinese red pines, 50 kg of NaOH, 1.5 kg of columbium oxide catalyst and 398.5 kg of water, then blending the mixed solution well;

(2) pouring the mixed solution into a microwave reactor, setting the reaction temperature at 140° C. and the microwave power at 200 W, letting the reaction proceed for 0.5 h, cooling the reaction products, discharging materials, and filtering the materials to remove solid residues and obtain the lignin degradation products;

(3) adding 45 kg of calcium cyclamate into 410 kg of lignin degradation products obtained in step (3), and letting the solution react for 30 min at the temperature of 55° C. and at the revolving speed of 250 rpm;

(4) adding 31.25 kg of trioxymethylene (effective content) into the solution obtained after the reaction in step (4), stirring for reaction for 4.5 h at the temperature of 100° C., then slowly adding 10.0 kg of urea and 3.75 kg of isocyanate to let the reaction continue for 4 h;

(5) adjusting the pH value of the liquid product obtained after the condensation reaction ends to 10.5, cooling the product, and discharging the product to obtain the dispersant with a relative molecular weight of 11500.

Embodiment 6

A method for preparing dispersant using lignin degradation products includes the following specific steps:

(1) mixing 60 kg of sulfonate lignin of cotton straw, 30 kg of NaOH, 10 kg of NaAlO$_2$, 1.0 kg of columbium oxide catalyst and 399 kg of water, then blending the mixed solution well;

(2) pouring the mixed solution into a microwave reactor, setting the reaction temperature at 150° C. and the microwave power at 400 W, letting the reaction proceed for 2 h, cooling the reaction products, discharging materials, and filtering the materials to remove solid residues and obtain the lignin degradation products;

(3) adding 50 kg of sodium p-aminobenzenesulfonate into 420 kg of lignin degradation product obtained in step (3), and letting the solution react for 50 min at the temperature of 50° C. and at the revolving speed of 250 rpm;

(4) adding 12.5 kg of formaldehyde (effective content) into the solution obtained after the reaction in step (4), stirring for reaction for 3.5 h at the temperature of 95° C., then slowly adding 12.5 kg of urea and 5.0 kg of isocyanate to let the condensation reaction proceed for 4 h;

(5) adjusting the pH value of the liquid product obtained after the condensation reaction ends to 9.5, cooling the liquid, and discharging the liquid to obtain the dispersant with a relative molecular weight of 10980.

Embodiment 7

A method for preparing dispersant using lignin degradation products includes the following specific steps:

(1) mixing 40 kg of lignin obtained through an alkaline process (reeds and wheat straw mixed at a ratio of 1:2), 30 kg of KOH and 10 kg of LiOH, 1.8 kg of zirconia catalyst and 418.2 kg of water, then blending the mixed solution well;

(2) pouring the mixed solution into a microwave reactor, setting the reaction temperature at 170° C. and the microwave power at 300 W, letting the reaction proceed for 1 h, cooling the reaction products, discharging materials, and filtering the materials to remove solid residues and obtain the lignin degradation products;

(3) adding 37.5 kg of p-aminobenzenesulfonic acid into 430 kg of lignin degradation product obtained in step (3), and letting the solution react for 40 min at the temperature of 70° C. and the revolving speed of 250 rpm;

(4) adding 22.5 kg of formaldehyde (effective content) into the solution obtained after the reaction in step (4), stirring for reaction for 3 h at the temperature of 90° C., then slowly adding 8.75 kg of urea and 1.25 kg of isocyanate to let the condensation reaction proceed for 4 h;

(5) adjusting the pH value of the liquid product obtained after the condensation reaction ends to 10.0, cooling the product, and discharging the product to obtain the dispersant with a relative molecular weight of 14900.

Property Test

1. Ceramic Additive

A ceramic additive was taken as an example. Raw materials of pottery clay smashed and milled at different grades were placed in ball millers; the prepared dispersant which accounted for 0.6 wt % of the total mass of the pottery clay was added; a proper amount of water was added to adjust the water content of the slurry to 40 wt %; the slurry was milled for 10 min using a fast mill; after ball milling, the mobility of the slurry was tested, and the blank was prepared into test samples with a size of 120 mm×60 mm×5 mm to undergo the rupture strength test for green bodies. The test results can be seen in Table 1.

Contrast to the Embodiment

Raw materials of pottery clay smashed and milled at different grades were placed in ball millers; sodium tripolyphosphate ceramic additive which accounted for 0.6 wt % of the total mass of the pottery clay was added; a proper amount of water was added to adjust the water content of the slurry to 40 wt %; the slurry was milled for 10 min using a fast mill; after ball milling, the mobility and viscosity of the slurry were tested, and the blank was prepared into test samples with a size of 120 mm×60 mm×5 mm to undergo the rupture strength test for green bodies.

The test results of the above-mentioned embodiments 1-7 and the contrast to the embodiments can be seen in Table 1 below. From the results shown in Table 1 it can be seen that, under the condition of the same additive quantity, the product of the invention can well disperse ceramic slurry, is superior to sodium tripolyphosphate in the aspect of enhancement property, and can meet the pulping requirements of the ceramic industry.

| Product | Amount used (wt %) | Viscosity (mPa · s) | Flow time (s) | Rupture strength of green body (MPa) |
|---|---|---|---|---|
| Contrast | 0.6 | 78.0 | 17.2 | 0.55 |
| Embodiment 1 | 0.6 | 55.2 | 17.6 | 0.66 |
| Embodiment 2 | 0.6 | 85.2 | 21.8 | 0.59 |
| Embodiment 3 | 0.6 | 89.0 | 23.5 | 0.56 |
| Embodiment 4 | 0.6 | 62.2 | 18.5 | 0.59 |
| Embodiment 5 | 0.6 | 65.3 | 20.0 | 0.58 |
| Embodiment 6 | 0.6 | 77.0 | 21.1 | 0.55 |
| Embodiment 7 | 0.6 | 58.3 | 18.3 | 0.62 |

2. Concrete Water Reducer

A concrete water reducer was taken as an example. In accordance with GBT8077-2012 Methods for Testing Uniformity of Concrete Admixture and GB50119 Code for Concrete Admixture Application, the comparison between effects of the dispersant prepared by the invention and other similar products on mobility (mm) of the cement paste can be seen in Table 2. From the results shown in table 2 it can be seen that the product of the invention achieves good water reduction and dispersion effects on different varieties of concrete.

TABLE 2

Effects of the dispersant prepared by the invention and other similar products on mobility (mm) of the cement paste

| Water reducer | Amount used (wt %) | Mobility of cement paste of different varieties | | |
|---|---|---|---|---|
| | | Lianshi cement | Tapai cement | Jinniu cement |
| Embodiment 1 | 0.7 | 156 | 168 | 161 |
| Embodiment 7 | 0.7 | 150 | 160 | 155 |
| Calcium lignosulphonate (powder, industrial) | 0.7 | 143 | 162 | 157 |
| Amido-sulfonic acid series efficient water reducer (powder, industrial) | 0.7 | 155 | 165 | 160 |

3. Dye Dispersant

Dye dispersant was taken as an example. The thermal stability of the dispersant prepared by the invention in the vat dye and the disperse dye was tested by reference to HG/T3507-2008 Sodium Lignie Sulphonate Dispersing Agent and GB/T27597-2011 Dyestuff-Determination of Diffusibility. From the test results shown in Table 3 and Table 4 it can be seen that the product of the present can well disperse the dye and has high thermal stability.

TABLE 3

Thermal stability of the dispersant applied to vat olive at different temperatures

| | Thermal stability | | |
|---|---|---|---|
| Product | 100° C. | 130° C. | 150° C. |
| Embodiment 1 | Grade 5 | Grade 5 | Grade 5 |
| Embodiment 2 | Grade 5 | Grade 4 | Grade 4 |
| Embodiment 3 | Grade 5 | Grade 4 | Grade 4 |
| Embodiment 4 | Grade 5 | Grade 5 | Grade 5 |
| Embodiment 5 | Grade 5 | Grade 5 | Grade 4 |
| Embodiment 6 | Grade 5 | Grade 5 | Grade 4 |
| Embodiment 7 | Grade 5 | Grade 5 | Grade 5 |

TABLE 4

Thermal stability of the dispersant applied to different types of dye at the temperature of 150° C.

| | Thermal stability | | | |
|---|---|---|---|---|
| Product | Vat black | Vat olive | Disperse red 191 | Disperse violet |
| Embodiment 1 | Grade 5 | Grade 5 | Grade 5 | Grade 5 |
| Embodiment 2 | Grade 4 | Grade 4 | Grade 4 | Grade 5 |
| Embodiment 3 | Grade 4 | Grade 4 | Grade 4 | Grade 4 |
| Embodiment 4 | Grade 5 | Grade 4 | Grade 5 | Grade 5 |
| Embodiment 5 | Grade 5 | Grade 4 | Grade 5 | Grade 4 |
| Embodiment 6 | Grade 5 | Grade 4 | Grade 5 | Grade 4 |
| Embodiment 7 | Grade 5 | Grade 5 | Grade 5 | Grade 5 |

4. Coal Water Slurry Additive

Take the coal water slurry additive. The dispersity and thermal stability of the dispersant prepared by the invention in coal water slurry were tested. Coal of China Shenghua was selected as the study object. The coal was smashed, milled, screened and graded, and then added with a certain amount of water and dispersant (added by 0.4 wt %). The mixture was uniformly stirred to obtain coal water slurry with different concentrations. The viscosity of the coal water slurry was determined using a viscosimeter, and the stability of the coal water slurry was tested by the rod-drop method. From the test results shown in Table 5 it can be seen that the product of the present can well disperse the coal water slurry and has high stability.

| | Property of coal water slurry | | | |
|---|---|---|---|---|
| Product | Maximum slurry concentration/% | Viscosity/ mPa · s | Slurry mobility | Slurry stability |
| Embodiment 1 | 64.9 | 750 | A$^+$ | A |
| Embodiment 2 | 66.6 | 980 | A$^-$ | B |
| Embodiment 3 | 66.9 | 1050 | A$^-$ | B |
| Embodiment 4 | 65.5 | 880 | A$^+$ | A |
| Embodiment 5 | 65.8 | 910 | A | A |
| Embodiment 6 | 66.0 | 990 | A | A |
| Embodiment 7 | 65.3 | 870 | A$^+$ | A |

The above are preferred embodiments of the invention. All equivalent changes, amendments, replacements and modifications made by those ordinarily skilled in the field according to the principle and concept of the invention shall fall within the protective scope of the invention.

REFERENCES

[1] Hill C A S. Wood modification: chemical, thermal and other processes[M]. John Wiley & Sons, 2007.
[2] Azadi P, Inderwildi O R, Farnood R, et al. Liquid fuels, hydrogen and chemicals from lignin: A critical review[J]. Renewable & Sustainable Energy Reviews, 2013, 21(5): 506-523.

[3] Feghali E, Cantat T. Unprecedented organocatalytic reduction of lignin model compounds to phenols and primary alcohols using hydrosilanes[J]. Chemical Communications, 2014, 50(7): 862-865.

[4] Lu Tingting, Fang Guigan, Zhuo Zhiffei, et al. Chemical modifications of lignins and applications thereof in polyurethane synthesis [J]. Paper and paparmaking 2013, 32(11):55-58.

[5] Pandey M P, Kim C S. Lignin depolymerization and conversion: a review of thermochemical methods[J]. Chemical Engineering & Technology, 2011, 34(1): 29-41.

[6] Shao, Yi, Xia, et al. Selective production of arenes via direct lignin upgrading over a niobium-based catalyst[J]. Nature Communications, 2017, 8:16104.

[7] Huang J, Zhang L, Wei H, et al. Soy protein isolate/kraft lignin composites compatibilized with methylene diphenyldiisocyanate[J]. Journal of applied polymer science, 2004, 93(2): 624-629.

[8] Xue B L, Huang P L, Sun Y C, et al. Hydrolytic depolymerization of corncob lignin in the view of a bio-based rigid polyurethane foam synthesis[J]. Rsc Advances, 2017, 7(10):6123-6130.

What is claimed is:

1. A method for preparing dispersant using lignin degradation products, wherein preparation of the lignin degradation products in step (1) comprises the following specific sub-steps:
  1) mixing lignin, an alkaline activator and the metal oxide catalyst by a mass ratio, suspending the mixed materials in an aqueous solution, and blending the mixture well;
  2) letting the mixed substances to react for 0.5 to 2 h at a temperature within the range of 120-200° C. and microwave power within a range of 200-400 W;
  3) performing suction filtration after the reaction liquid gets cool to remove solid residues and obtain the lignin degradation products;
  wherein preparation of the dispersant in step (2) specifically comprises the following sub-steps:
  1) adding monomers to the lignin degradation products obtained in step (1), letting the mixed materials react for 30-50 min at a temperature within a range of 50-70° C., then slowly adding a cross-linking agent, stirring the substances to let a reaction proceed for 2.5-4.5 h at a temperature within the range of 80-100° C., and after the reaction ends, adding urea and isocyanate to let condensation reaction proceed for 4 h;
  2) adjusting the pH value of the liquid obtained after the condensation reaction to 9.5-10.5, and cooling the liquid to room temperature to obtain the dispersant.

2. The method for preparing dispersant using lignin degradation products according to claim 1, wherein in step (1), preparation of the lignin degradation products, the following ingredients are added in percentage by mass:
  8.0%-12.0% of lignins;
  4.0%-16.0% of alkaline activator;
  0.1%-0.5% of catalyst;
  75.5%-85.6% of water;
  in step (2), preparation of the dispersant, the following ingredients are added in percentage by mass:
  7.5%-12.5% of monomers;
  80.0%-86.0% of lignin degradation products;
  2.5%-6.25% of cross-linking agent;
  1.25%-2.5% of urea; and,
  0.25%-1.25% of isocyanate.

3. The method for preparing dispersant using lignin degradation products according to claim 2, wherein the lignins are any one of alkaline lignin obtained from bamboo pulp, lignin obtained rice hulls using an organic solvent, milled wood linin of eucalyptuses, lignin obtained by enzymolysis of corn cobs, sulfate lignin of Chinese red pines, sulfonate of cotton straw, lignin obtained through an alkaline process using reeds and wheat straw mixed at a ratio of 1:2.

4. The method for preparing dispersant using lignin degradation products according to claim 2, wherein the alkaline activator is any one or a mixture of several ones of NaOH, KOH, LiON, $Na_2CO_3$, $K_2CO_3$ and $NaAlO_2$ at any ratio.

5. The method for preparing dispersant using lignin degradation products according to claim 2, wherein the catalyst is any one or a mixture of several ones of zirconia, molybdenum oxide, zinc oxide, titanium oxide and columbium oxide at any ratio.

6. The method for preparing dispersant using lignin degradation products according to claim 2, wherein the monomers are any one or a mixture of several ones of aminosulfonic acid, p-aminobenzenesulfonic acid, sodium p-aminobenzenesulfonate, sodium cyclohexylsulfamate and calcium cyclamate at any ratio.

7. The method for preparing dispersant using lignin degradation products according to claim 2, wherein the cross-linking agent is any one or a mixture of several ones of formaldehyde, acetaldehyde, glutaraldehyde, acraldehyde and trioxymethylene at any ratio.

* * * * *